United States Patent [19]

Long

[11] 4,026,431

[45] May 31, 1977

[54] TOBACCO HARVESTER HAVING A BULK CONTAINER FILLED BY MANUAL PRIMERS

[75] Inventor: William R. Long, Tarboro, N.C.

[73] Assignee: Long Mfg. N. C., Inc., Tarboro, N.C.

[22] Filed: Dec. 18, 1975

[21] Appl. No.: 642,105

[52] U.S. Cl. .............................. 214/519; 214/83.1
[51] Int. Cl.² .......................................... B60P 1/36
[58] Field of Search ............... 214/83.1, 505, 519, 214/521, 522; 198/79, 80, 83

[56] References Cited

UNITED STATES PATENTS

| | | |
|---|---|---|
| 2,782,943 | 2/1957 | Jones et al. ........................ 214/83.1 |
| 2,861,703 | 11/1958 | Imazimi et al. .................... 214/83.1 |
| 3,107,018 | 10/1963 | Mish, Jr. ............................ 214/83.1 |
| 3,215,288 | 11/1965 | Long et al. ..................... 214/83.1 X |
| 3,827,446 | 8/1974 | Honeycutt ..................... 214/83.1 X |

FOREIGN PATENTS OR APPLICATIONS

| | | | |
|---|---|---|---|
| 1,242,491 | 8/1971 | United Kingdom .............. 214/83.1 |

*Primary Examiner*—Albert J. Makay

[57] ABSTRACT

Tobacco harvesting apparatus having a plurality of seats for workmen to hand prime tobacco plants and having a plurality of conveyors for transporting the tobacco leaves and discharging such leaves into a large bulk container.

1 Claim, 4 Drawing Figures

TOBACCO HARVESTER HAVING A BULK CONTAINER FILLED BY MANUAL PRIMERS

BACKGROUND OF THE INVENTION

1. Field of the Invention.

This invention relates generally to the harvesting of vegetation of various kinds and relates particularly to tobacco harvesters in which a plurality of workmen remove selected leaves from tobacco plants as the harvester passes through a field.

2. Description of the Prior Art.

In the past, efforts have been made to provide harvesters of many kinds for harvesting various crops so as to reduce the manual labor involved and thereby increase the efficiency with which the crop is harvested. Historically, the harvesting of tobacco has been a particularly tedious and difficult task which has involved entire families for periods of 6 to 8 weeks to harvest and cure a tobacco crop. Many commercial and educational institutions have involved themselves in designing, experimenting, and building apparatus to reduce the toil and drudgery of tobacco harvesting and this has resulted in many advancements in the art.

In my prior U.S. Pat. No. 3,215,288, which issued Nov. 2, 1965, a tobacco harvester was provided which included a plurality of seats for workmen to hand prime or selectively collect tobacco leaves from the stalks of tobacco plants and place such leaves on a conveyor which lifted the leaves to a platform located above the tobacco plants. At the platform, the conveyors discharged the tobacco leaves into bins at opposite sides thereof and additional workmen removed the tobacco leaves and placed the leaves in a predetermined position within a conventional bulk tobacco rack mounted on a turntable. After the tobacco rack was filled, another workman removed the filled rack from the turntable and placed an empty rack in position to be filled. This apparatus normally required eight people to operate at full capacity and included four primers, two rack loaders, one rack handler and a driver.

In recent years, many automatic defoliators have been provided in which some or all of the tobacco leaves have been mechanically stripped from the stalk and conveyed upwardly where they were discharged into a large container. However, automatic defoliators are non-selective in their operation and have not only discharged usable tobacco leaves into the container, but also suckers, weeds or any other undesirable vegetation which subsequently must be separated from the usable leaves. Also, automatic defoliators are expensive and many tobacco farmers cannot afford to buy such a machine which can be used less than 2 months in a year.

Some additional examples of the prior art are U.S. Pat. Nos. 2,564,614 to Sowers; 2,933,206 to Alphin, Jr.; 3,841,071 to Pinkham et al; 3,845,609 to Whitley; and 3,885,376 to Johnson.

SUMMARY OF THE INVENTION

The present invention is embodied in a motorized tobacco harvester which is adapted to be driven through a field of tobacco plants and such harvester is provided with a plurality of spaced seats. In the present instance, two seats are mounted on each side of the harvester and are located adjacent to the ground so that workmen may sit on the seats and hand prime or selectively gather mature tobacco leaves from plants as they are carried between rows of such plants. Ordinarily one of the workmen on each side will be working on the lefthand row and the other workman will be working on the righthand row, although it is contemplated that a single workman on each side of the harvester could prime both rows of tobacco plants. A vertically disposed conveyor is located adjacent to each workman so that the workman can place the tobacco leaves which have been collected onto the conveyor and the conveyor carries the leaves upwardly to a position above a raised deck on the harvester. At the upper end of the conveyor the tobacco leaves are discharged onto a downwardly and inwardly inclined slide which permits the leaves to gravitate onto a longitudinally disposed conveyor which carries the leaves rearwardly and discharges the leaves into a large bulk rack container. One workman normally is located on the harvester deck so that he can steer the harvester through the field when necessary and turn the harvester around at opposite ends thereof. Preferably the harvester is provided with a conventional row guide located in front of the forward wheel to keep the harvester wheels in the furrows between rows of tobacco so that it is not essential that the workman on the deck continuously steer the harvester. When he is not steering, the workman on the deck may take a pitchfork or other similar implement and spread the tobacco leaves substantially evenly throughout the bulk tobacco container.

It is an object of the invention to provide a motorized tobacco harvester which transports a plurality of workmen through a tobacco field so that the workmen can hand prime the tobacco plants and place the separated leaves onto a conveyor system which discharges such leaves into a bulk container.

DESCRIPTION OF THE PREFERRED EMBODIMENT

Figure 1:
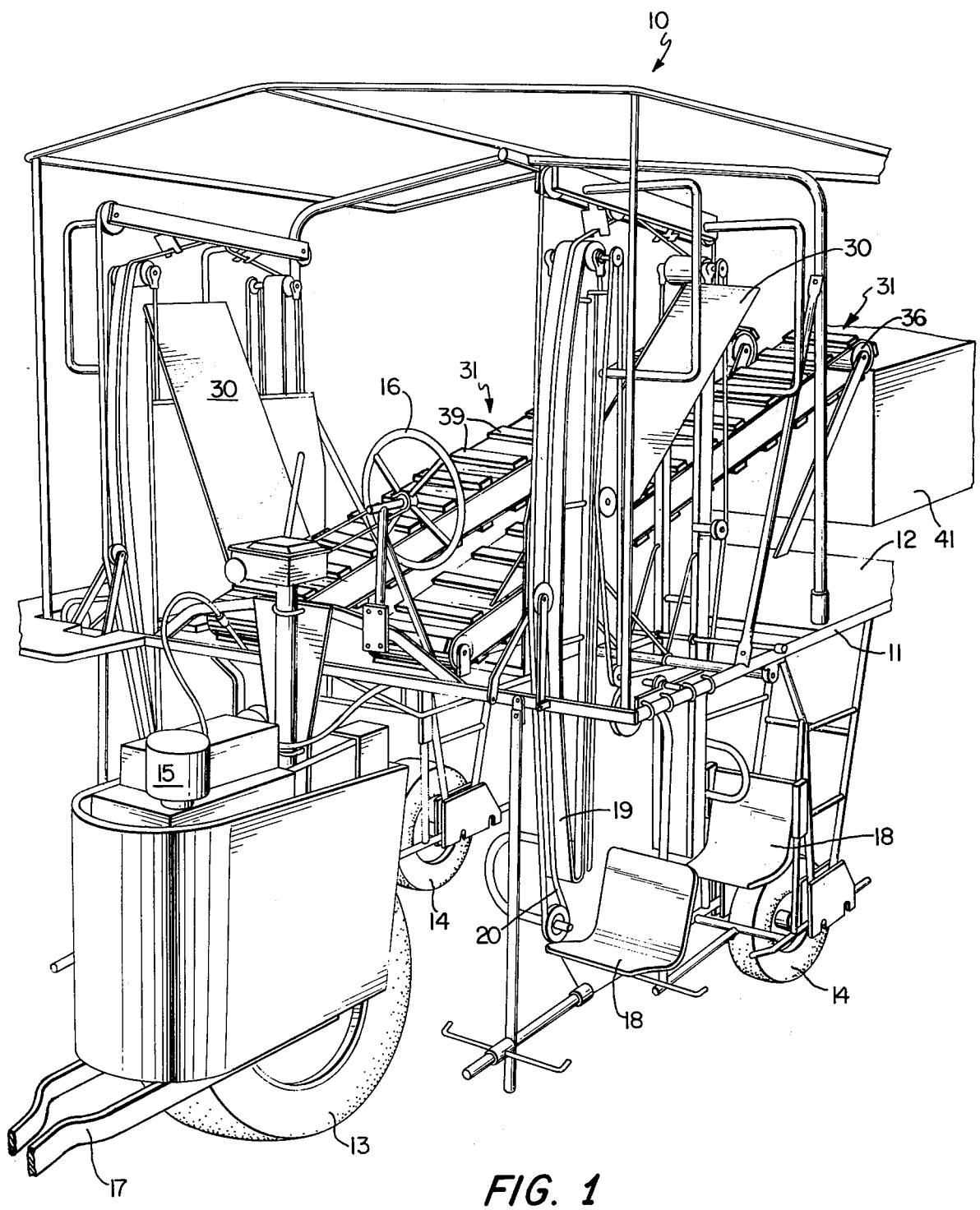
FIG. 1 is a perspective illustrating one embodiment of the tobacco harvester of the present invention.
Figure 2:
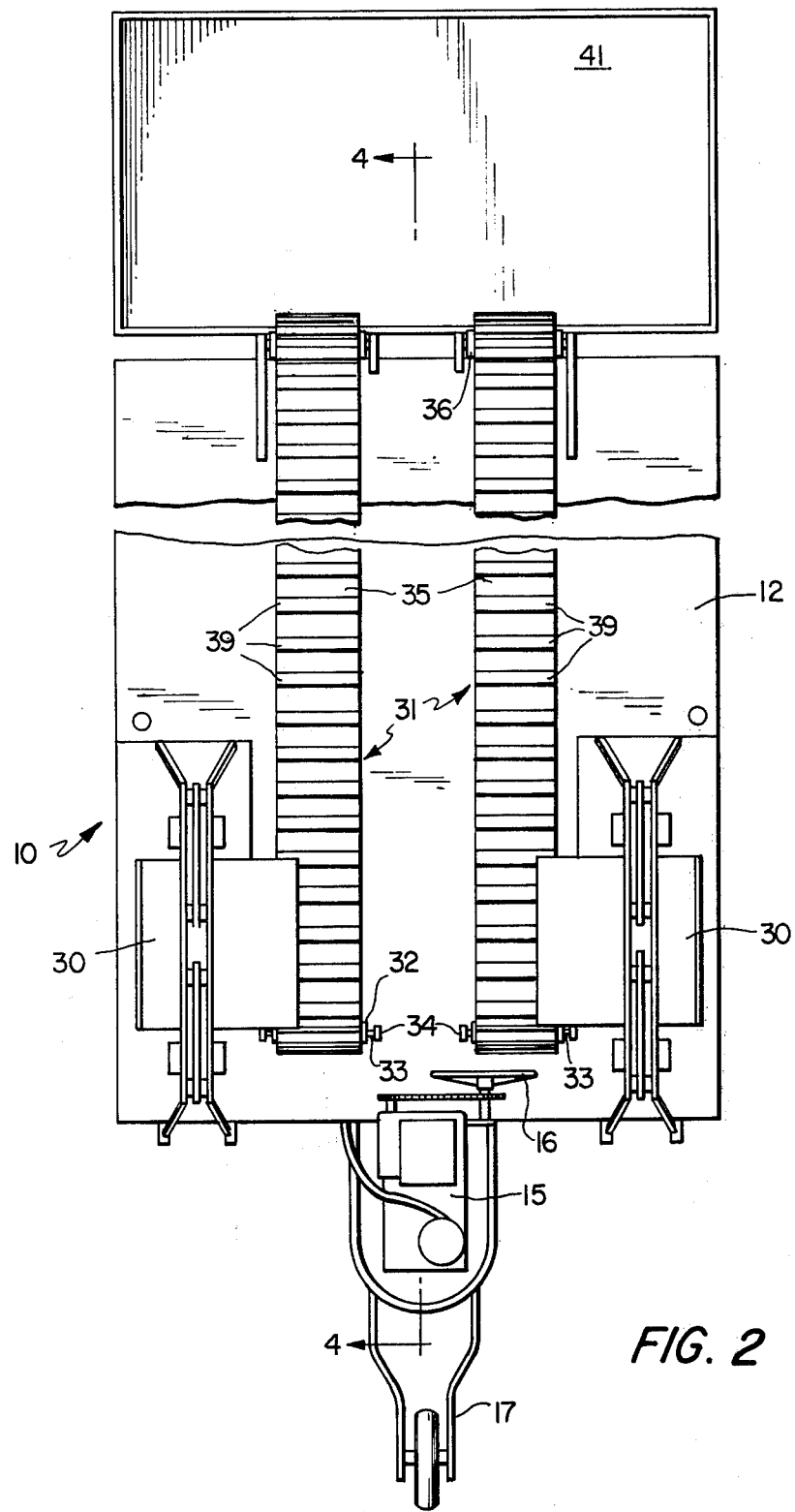
FIG. 2 is a top plan view thereof.
Figure 3:
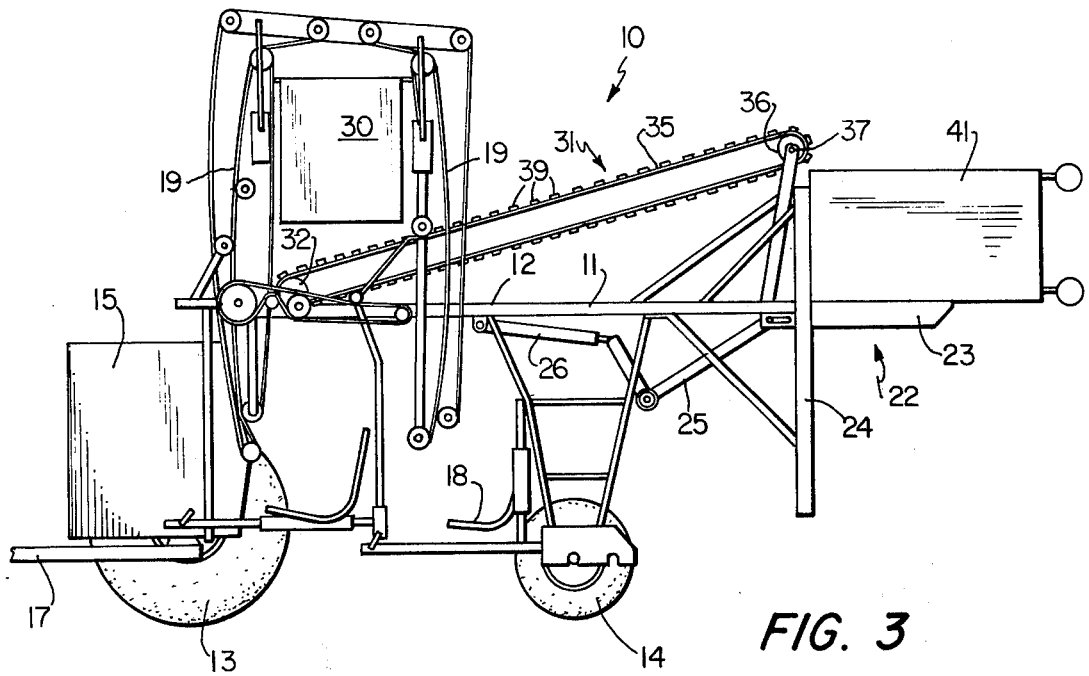
FIG. 3 is a side elevation.

With continued reference to the drawings, a tobacco harvester 10 is provided having a frame 11 on which a raised deck 12 is mounted. The frame 11 is supported by a front propelling wheel 13 and a pair of rear wheels 14. The propelling wheel is driven by a power plant 15 and is controlled by a steering mechanism including a steering wheel 16 mounted on the deck 12. Preferably, a conventional row guide mechanism 17 is connected to the front wheel 13 to maintain such front wheel in a furrow between rows of tobacco plants so that it is not necessary for a driver to steer the harvester at all times. A pair of aligned seats 18 are suspended from the frame 11 at each side of the harvester in any desired manner so that the seats are located between rows of tobacco plants and may be disposed adjacent to the ground. If desired, the seats 18 may be vertically adjustable relative to the ground so that such seats are located adjacent to a particular portion of the tobacco plants.

A plurality of generally vertically disposed endless conveyors 19 are supported on the frame 11 and the lower end of each conveyor is located adjacent to one of the seats while the upper end is disposed above the deck 12. An endless belt 20 engages the upward run of ach conveyor 19 so that a workman, who is sitting on seat 18, can prime tobacco leaves and place the leaves between the conveyor 19 and the belt 20 and such leaves are carried upwardly to a position above the deck where they are discharged from the conveyor. The conveyors 19 and belts 20 are driven in any conventional manner, as by chains and sprockets driven by drive shaft 21 which in turn may be driven from the power plant 15 or by a sprocket fixed to one of the rear wheels 14.

At the rear of the frame 11, a selectively operated lift mechanism 22 is provided for raising a pair of lift tines 23 or a platform from the ground to a position above the tobacco plants. As illustrated, the lift mechanism includes vertically disposed guide members 24 mounted on the frame 11 and in which a carriage having the tines 23 connected thereto is vertically movable by a bell crank 25 operated by a fluid cylinder 26. It is noted that the lift mechanism 22 can be raised and lowered by any other conventional lift mechanism.

The structure thus far described is shown in my prior U.S. Pat. No. 3,215,288.

Above the deck 12 a pair of opposed inwardly and downwardly inclined slides 30 are mounted in any desired manner at opposite sides of the deck and between the forward and rearward vertically disposed conveyors. As illustrated, the forward conveyor 19 discharges the tobacco leaves rearwardly, and the rearward conveyor 19 discharges tobacco leaves forwardly so that leaves from both conveyors at each side of the harvester are discharged onto the upper portion of one of the slides 30.

Figure 4:
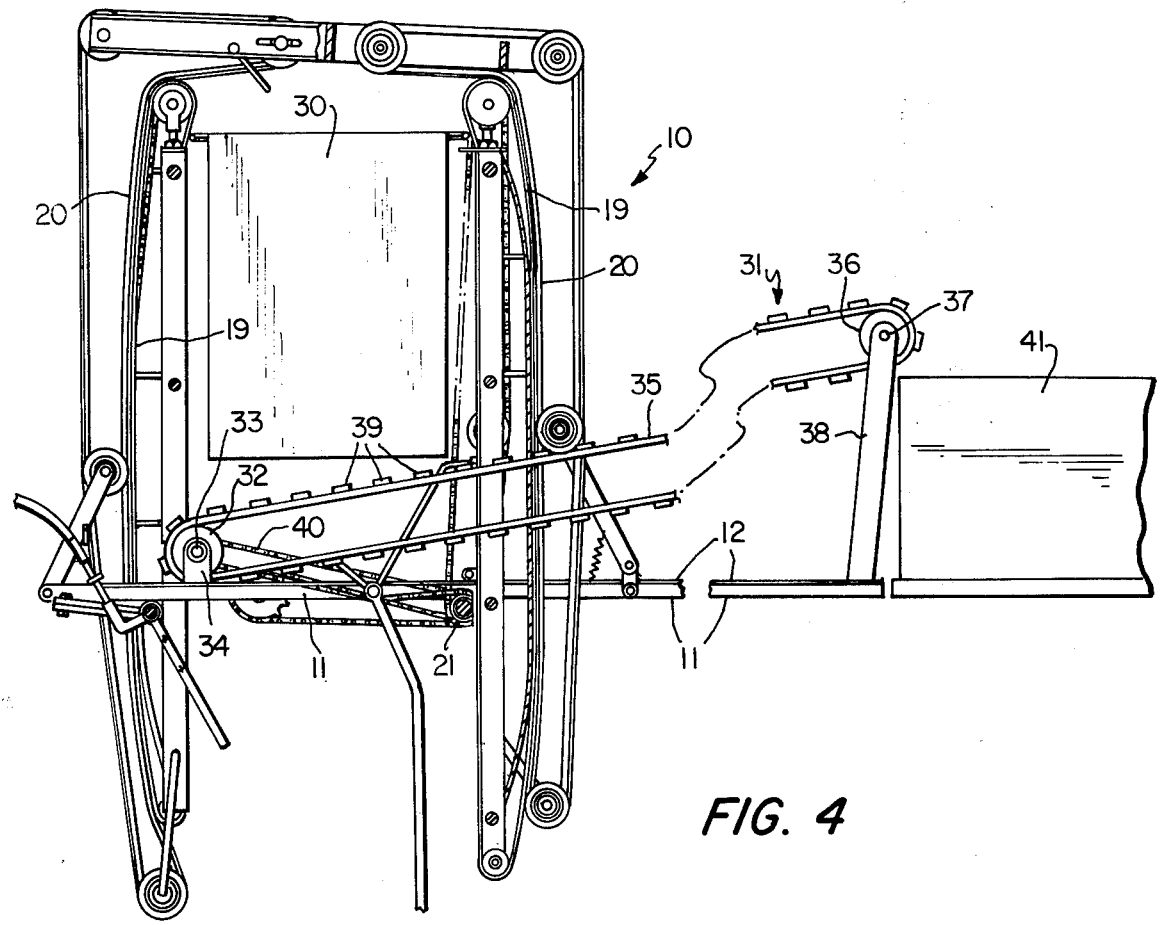
FIG. 4 is a fragmentary section on the line 4—4 of FIG. 2.

A pair of generally longitudinally disposed conveyors 31 are mounted on the upper surface of the deck 12 with the forward portion of each conveyor being located directly below the lower end portion of one of the slides 30. Each of the conveyors 31 includes a drive roller 32 carried by a shaft 33 which is rotatably mounted in lugs 34 mounted on the deck 12. An endless belt 35 drivingly engages the roller 32 and extends upwardly and rearwardly about an idler roller 36 mounted on a shaft 37 which is rotatably carried in a support frame 38. The conveyor belt 35 preferably has a plurality of laterally disposed slats 39 which support the tobacco leaves, and, if desired, the belt 35 may be either imperforate or foraminated. Also, it is contemplated that the belt 35 could consist of two or more strips having a plurality of slats 39 connected thereto. The drive roller 32 may be driven in any desired manner such as a sprocket (not shown) which is fixed to the shaft 33 and is connected by a chain 40 to a sprocket fixed to the drive shaft 21 (FIG. 4).

A large bulk tobacco receiving container 41 is carried on the tines or platform 23 at the rear of the deck 12 and adjacent to the discharge end of both of the conveyors 31. The upper side of the container 41 is open and such open side is disposed below the upper run of the conveyors so that tobacco leaves discharged from the conveyors 31 fall into the container where at least most of the leaves are disposed in a flat plane.

In the operation of the device, a workmandriver on the deck 12 steers the harvester 10 to a field of tobacco plants having at least some leaves which are mature enough to harvest. At the field, the driver aligns the harvester so that the front wheel 13 is disposed along a furrow between rows of tobacco plants and the rear wheels 14 are disposed along adjacent furrows. One or two workmen or primers sit on the seats 18 at each side of the harvester and as the harvester moves through the field, the primers select and remove desired leaves from the tobacco plants. The primers may place each individual leaf between the vertical conveyor 19 and the endless belt 20 which is adjacent to him or he may accumulate several leaves before placing them on the conveyor.

The conveyors 19 and belts 20 are operating continuously and lift the leaves to the upper end of the conveyors where such leaves are discharged onto the slides 30. The leaves gravitate or slide downwardly and inwardly along the slides 30 and are discharged onto the upper runs of the conveyors 31. The conveyors 31 are operated continuously with the upper run being inclined upwardly and rearwardly so that when the tobacco leaves are discharged onto the upper run, such leaves are raised to a height greater than the dimensions of the container 41. At the rear end of the conveyors 31, the tobacco leaves are discharged into the container 41 in a random haphazard manner with the stems disposed in any direction. However, most of the leaves fall flat into the container.

When the harvester is in operation, the row guide mechanism 17 maintains the harvester in alignment with the rows of tobacco plants automatically so that periodically the workman on the deck may take a pitchfork or other pointed implement and spread the leaves within the container so that the container is substantially evenly filled and the tobacco leaves are disposed in the corners of the container as well as in the middle. Preferably the harvester 10 travels at a speed of approximately one to three miles per hour through the tobacco field so that the primers may select and remove only the leaves which are mature enough for curing. When the harvester reaches the end of a row, the workman on the deck moves to the front of the harvester and operates the steering wheel 16 to cause the harvester to enter the rows of tobacco plants in an area adjacent to the area just traversed so that the priming operation continues.

If the container is filled or substantially filled at the end of a row, the lift mechanism 22 is operated to drop the tines 23 and discharge the container 41 either onto a wagon or other vehicle for transporting the container to a barn for curing, or the lift mechanism may discharge the container onto the access roadway adjacent to the field for later removal to the curing barn. After the container 41 has been discharged from the lift mechanism, an empty container is placed thereon and raised to a height substantially equal to the deck 12 and above the tobacco plants in the field. Thereafter the harvester re-enters the field of tobacco plants and the priming operation continues.

I claim:

1. In a tobacco harvester adapted to be moved through a field of tobacco plants, the harvester having a frame, deck means on the frame located above the tobacco plants, a plurality of seats suspended from said frame for supporting manual priming workmen between rows of tobacco plants, at least two generally vertically movable conveyor means located on each side of the harvester with each conveyor adjacent a seat so that the conveyor means may be used for transporting primed tobacco leaves upwardly to a discharge position above the deck, and one of said generally vertically movable conveyor means discharging forwardly and the other discharging rearwardly, the improvement comprising inclined slide means oriented in a generally opposite relationship along opposite sides of the deck, each of said slide means having a first portion disposed in a position to receive tobacco leaves discharged from two of the vertically movable conveyor means, and a second portion extending generally downwardly and inwardly from the side and above the deck, longitudinally movable conveyor means mounted on the deck means of said harvester and extending transversely to said slide means, the forward portion of the upper run of said longitudinal conveyor means being located beneath said second portion of said slide and extending upwardly and rearwardly therefrom, means for driving said longitudinal conveyor so that said upper run moves rearwardly, and a bulk tobacco container removably mounted on said harvester in a position to receive tobacco leaves discharged from said longitudinal conveyor, whereby mature tobacco leaves which are collected by the manual priming workmen and placed on the vertically movable conveyor means are automatically discharged into said container.

* * * * *